US006989854B1

(12) United States Patent
Figov et al.

(10) Patent No.: US 6,989,854 B1

(45) Date of Patent: Jan. 24, 2006

(54) IMAGING APPARATUS FOR EXPOSING A PRINTING MEMBER AND PRINTING MEMBERS THEREFOR

(75) Inventors: Murray Figov, Ra'anana (IL); Serge Steinblatt, Ra'anana (IL); Ilan Ben Oren, Jerusalem (IL); Albert Benezra, Maccabim (IL)

(73) Assignee: A.I.T. Israel Advanced Technology Ltd, Tel-Aviv ( * ) Notice: Subject to any disclaimer, the term of this patent is extended or adjusted under 35 U.S.C. 154(b) by 0 days.

(21) Appl. No.: 09/525,579

(22) Filed: Jul. 24, 1998

Related U.S. Application Data

(63) Continuation of application No. PCT/IL97/00028, filed on Jan. 22, 1997.

(30) Foreign Application Priority Data

Jan. 24, 1996 (IL) ..................................... 116885

(51) Int. Cl.
*B41J 2/45* (2006.01)
*B41J 2/46* (2006.01)
*G02B 27/64* (2006.01)

(52) U.S. Cl. ...................................................... 347/244

(58) Field of Classification Search ................ 347/241, 347/244, 256, 258
See application file for complete search history.

(56) References Cited

U.S. PATENT DOCUMENTS 3,506,779 A 4/1970 Brown et al.
3,574,657 A 4/1971 Burnett
3,628,953 A 12/1971 Brinckman
3,773,404 A 11/1973 Moore
4,054,094 A 10/1977 Caddell et al.
4,492,970 A 1/1985 Lee et al.
4,548,893 A 10/1985 Lee et al.
4,563,056 A 1/1986 Tagawa et al.
4,693,958 A 9/1987 Schwartz et al.
4,731,317 A 3/1988 Fromson et al.
4,867,545 A 9/1989 Wakimoto et al.
4,880,299 A 11/1989 Hamada
4,959,664 A 9/1990 Naiki et al.
4,975,717 A 12/1990 Takemoto et al.

(Continued)

FOREIGN PATENT DOCUMENTS

EP 407054 1/1991

(Continued)

OTHER PUBLICATIONS

Chambers, Science and Technology Dictionary, W & R Chambers, Ltd. (1991).

(Continued)

*Primary Examiner*—Huan Tran
(74) *Attorney, Agent, or Firm*—Katten Muchin Rosenman LLP

(57) ABSTRACT

Apparatus, including a printing system, press, press components, and printing members for lithographic printing and other similar processes, is disclosed. The printing system for imaging printing members includes a plurality of infra red laser diodes coupled to a respective optical fiber for providing an output light beam, and a stationary telecentric lens assembly, that operates to image a printing member by exposure from ablative infra-red radiation. The printing members include a first substrate layer, with a second radiation absorbing layer over this first layer, for supporting an image ablated onto the printing member. A third surface coating layer is over the second layer. The third layer is substantially abdhesive to ink while the second layer has an affinity for ink opposite that of the third layer. Methods for imaging with the apparatus and for imaging the printing members are also disclosed.

19 Claims, 7 Drawing Sheets

U.S. PATENT DOCUMENTS

| | | | |
|---|---|---|---|
| 5,109,460 A | 4/1992 | Baek et al. | |
| 5,168,288 A | 12/1992 | Baek et al. | |
| 5,180,652 A | 1/1993 | Yamaguchi et al. | |
| 5,188,032 A | 2/1993 | Lewis et al. | |
| 5,212,048 A | 5/1993 | Lewis et al. | |
| 5,270,368 A | 12/1993 | Lent et al. | |
| 5,310,869 A | 5/1994 | Lewis et al. | |
| 5,339,737 A | 8/1994 | Lewis et al. | |
| 5,353,705 A | 10/1994 | Lewis et al. | |
| 5,357,617 A | 10/1994 | Davis et al. | |
| 5,378,580 A | 1/1995 | Leenders | |
| 5,379,698 A | 1/1995 | Nowak et al. | |
| 5,385,092 A | 1/1995 | Lewis et al. | |
| 5,414,561 A | 5/1995 | Wakimoto et al. | |
| 5,469,787 A | 11/1995 | Turner et al. | |
| 5,605,097 A | 2/1997 | Ruckl et al. | |
| 5,745,153 A * | 4/1998 | Kessler et al. | 347/241 |
| 5,781,224 A * | 7/1998 | Ruckl et al. | 347/248 |
| 5,808,657 A * | 9/1998 | Kurtz et al. | 347/239 |

FOREIGN PATENT DOCUMENTS

| | | |
|---|---|---|
| EP | 679510 | 11/1995 |

OTHER PUBLICATIONS

Nechiporenko et al. “Direct Method of Producing Waterless Offset Plates by Controlled Laser Beam”, USSR Research Institute for Complex Problems in Graphic Arts, pp. 139-148.

* cited by examiner

PRIOR ART

PRIOR ART

IMAGING APPARATUS FOR EXPOSING A PRINTING MEMBER AND PRINTING MEMBERS THEREFOR

This is a continuation of international application Serial No. PCT/IL97/00028, filed 22 Jan. 1997, which is incorporated herein by reference.

FIELD OF THE INVENTION

The present invention relates to lithographic offset printing and components employed in apparatuses therefor. In particular, the present invention is directed to an imaging apparatus for a printing system which comprises a plurality of infra red (IR) laser diodes and a telecentric lens assembly, a cylinder assembly and a printing member.

BACKGROUND OF THE INVENTION

Arrays comprising a plurality of laser diodes are well known in the art. In one application of laser diode arrays, individual diodes can be modulated so as to expose an IR sensitive printing member on a drum. In one known application, the drum is part of a thermal printer as described for example in U.S. Pat. Nos. 5,109,460 and 5,168,288 assigned to Eastman Kodak Company (Kodak) of Rochester, N.Y., U.S. In a second application, the drum may be a part of digital printing press as described for example in U.S. Pat. Nos. 5,357,617 and 5,385,092 assigned to Presstek Inc. of New Hampshire, U.S. In a third application the drum may be a drum of a computer to plate image setter.

Generally speaking, two types of IR diode lasers imaging apparatus are known in the art. In one type, described in the above mentioned patents assigned to Presstek Inc., the light emitted by each laser diode is focused by a corresponding focusing lens. Thus, a large number of lenses are required, whereby the complexity and the cost of the imaging apparatus increase.

In the second type of imaging apparatus, described in the above mentioned patents assigned to Kodak and schematically illustrated in FIG. 1 to which reference is now made, the thermal printer 1 includes a movable imaging apparatus 10 moving in the direction indicated by arrows 2 to affect line by line scanning on a drum 11 rotating about a longitudinal axis as indicated by arrow 4.

The movable imaging apparatus 10 comprises an array of IR laser diodes 12 of which five, referenced 12A–12E, are shown in FIG. 1. Each laser diode 12 is attached to a corresponding optical fiber 13A–13E in a pigtail type attachment, the light emitting ends of the plurality of fiber optics are aligned at 14.

In this type, the light from all IR laser diodes 12 is focused onto the drum 11 by a single optical assembly 15. The optical assembly 15 comprises a stationary lens assembly 16 and a movable focusing lens or lens assembly 17. In FIG. 1 an exemplary light path 18C is shown for the light emitted by laser diode 12C to affect exposure of the medium mounted on drum 11 at exposure spot 19C.

One drawback of IR laser diodes is that in order to obtain the output power required to expose the IR sensitive medium, fiber optics with a large diameter, typically 100 microns, and a large numerical aperture, typically larger than 0.2, are required. Moreover, in order to meet quality requirements of the exposed image, the focusing lens images the output of the fiber optics with a demagnification ratio of 3, thus leading to a numerical aperture of 0.6 towards the image plane.

Since the numerical aperture of the focusing lens is high, an autofocusing mechanism is designed to compensate for changes in the distance between the surface of the printing member and the aligned light emitting end 14 of the fiber optics 13. This autofocusing compensation mechanism includes the movable lens or lens assembly 17 which is movable between stationary lens assembly 16 and the drum 11 as indicated by arrow 6.

In the illustrated example, lens 17 moves from its position 17 to its position 17' as indicated by arrow 6 so as to change the optical path from 18 to 18' in order to expose the light sensitive medium in exposure spot 19C' thus compensating for the movement of the medium on the drum 11 as indicated by location 11' of the drum.

A drawback autofocusing optical assemblies, in particular ones which provide an accuracy of the exposed spot in terms of location and spot size on the order of microns is their cost and complexity and the fact that they are prone to mechanical failures.

A lens assembly known in the art which replaces autofocus lens assemblies is shown in FIG. 2 to which reference is now made. FIG. 2 illustrated a system similar to that of FIG. 1 except that it includes a stationary lens assembly 25 instead of the autofocus lens assembly 15.

In a system with a prior art stationary lens assembly, a change in the distance between the distance of the printing member on drum 11, schematically illustrated by the dashed drum 11', and the aligned edge 14, results in a change in the location of the corresponding exposure spots from 19A and 19E to 19A' and 19E', respectively. As illustrated in exaggeration for illustration purposes in FIG. 2, the lateral distance between exposure spots 19A' and 19E' is larger than the lateral distance between exposure spots 19A and 19E, i.e., the position accuracy of the exposure spot on the drum 24 is adversely affected by changes in distance between the printing member and the aligned edge of the optical fibers 14.

Printing members, typically in the form of waterless printing plates, for use with lithographic printing presses and components therefor, commonly have an oleophilic (ink attractive) substrate layer that is usually either aluminum or polyester; an intermediate infra-red radiation absorbing layer that could be carbon or other infra-red radiation absorbing material, such as Nigrosine® dissolved or suspended in a binder resin, or a metal or metal oxide film such as titanium oxide sputtered onto polyester as the infra-red absorbing layer; and an oleophobic (ink abhesive) polysiloxane top coating layer.

These plates are imaged, typically by ablation with an infra-red laser, such that an image is placed on the substrate layer, that is oleophilic, to attract and retain the ink. The ablation process completely destroys the intermediate infra-red absorbing layer, and causes the polysiloxane coating layer to detach from the plate as well. Complete removal of the polysiloxane top layer affected by the ablation commonly involves additional cleaning. This additional cleaning is typically performed with a dry cloth or with a liquid, that may have a solvent effect. The cleaning process results in the complete removal of both the top polysiloxane layer and the intermediate infra-red radiation absorbing layer, leaving bare portions of the now imaged substrate layer.

When waterless offset printing is desired, a printing plate is mounted on a drum or the like and contacted with one or more forme rollers onto which a thin layer of waterless ink has been deposited. Where there is still silicone on the background areas of the plate, the ink is retained on the inking roller as it will not transfer to the plate surface, which has a very low surface energy and is termed abhesive and is oleophobic. The bare portions of the substrate provide an oleophilic surface and ink transfers from the ink roller onto the bare portions of this surface, such that the inked image may be transferred by an offset blanket (cylinder) onto printing media, such as paper.

These plates exhibit several drawbacks. Initially, the complete removal of the ablated top oleophobic coating and the infra-red radiation absorbing intermediate layers, which together may be several microns thick, results in a physical difference in height above the substrate layer. The distance between the unimaged remaining top coating layer and of the depressed imaged substrate layer, gives the plate an intaglio nature. Because this distance is large, transfer of the ink from this plate requires increased pressure of the forme rollers with respect to the ink surface, compared to that for planographic plates, to ensure that the ink reaches the depressed image surface. This in turn reduces the plate run life, because the increased pressure creates additional wear on the plate, shortening its usable life. This increased pressure also increases the chances of physical damage to the plate during running, such that a printing run may have to be prematurely terminated due to a damaged plate. In addition, because the surface of the image deeply depressed from the polysiloxane surface layer of the plate, the portions of the substrate to be imaged are set back from the inking roller (ink transferring source) at a distance such that there is a reduction in the ease of initial inking up of the plate. This increases the inking or coloring time for the plate and blanket cylinders, and subsequently, the number of copies necessary to be run before fully inked up copies start appearing.

Another drawback with these plates, that effects their imaging quality, is associated with their cleaning. These plates originally were hand cleaned, and as such, permitted the operator a great deal of involvement in ensuring good results by visually selecting imaged areas to be cleaned while leaving the unimaged areas not to be cleaned, and consequently, cleaning only those areas that required cleaning. Also, where the plates were ablated with high energy, it was possible to blast away the largest part of the top layer and the ablatable intermediate layer, so that any remaining loose material involved minimal wiping.

However, where the ablation energy is relatively low, it is necessary to clean these plates thoroughly. This is typically done automatically. However, automatic cleaning subjects unimaged areas to unnecessary cleaning, that can damage the background (remaining plate layers), and thus, reduce plate life. Cleaning also has to reach the depressed areas of the substrate, thus increasing cleaning difficulties.

A further difficulty with the plates is their lack of sensitivity to the infra-red radiation. This poor sensitivity results in using multiple high energy lasers in an array, that adds to printing costs.

SUMMARY OF THE INVENTION

According to a preferred embodiment of the present invention, an imaging apparatus which includes a plurality of IR laser diodes each coupled to a corresponding optical fiber, the optical fibers are aligned at a distance from an exposure surface and providing an output light beam, and a stationary telecentric lens assembly which operates to image the output light beam onto the exposure surface.

According to a preferred embodiment of the present invention, the output numerical aperture of the lens assembly is smaller than 0.45 wherein the output numerical aperture of the optical fibers is smaller than 0.15 and wherein the lens assembly having a demagnification power of at least three. Further, the intensity of the laser diodes is at least 0.5 Watt. Still further the spot size and the power density on the exposure surface are about 20 microns and exceeding 0.6 Megawatt per inch, respectively.

Additionally, according to a preferred embodiment of the present invention, the imaging apparatus may also include means for changing the intensity of each the laser diodes. Preferably, the means for changing the intensity of each the laser diodes include means for changing the current of each laser diode during exposure.

According to a preferred embodiment of the present invention, changes in the distance between the exposure surface and the aligned optical fibers are compensated within a range of 60 microns employing the telecentric lens assembly, changes in the distance between the exposure surface and the aligned optical fibers are compensated within a range of 40 microns employing the means for changing the laser diodes intensity, whereby a total range of compensation of 100 microns is achieved.

There is also provided, in accordance with a preferred embodiment of the present invention, a method for controlling the spot size of an imaging apparatus which includes a plurality of IR laser diodes each coupled to a corresponding optical fiber, the optical fibers are aligned at a distance from an exposure surface and providing an output light beam, and a stationary telecentric lens assembly which operates to image the output light beam onto the exposure surface. The method includes the step of selectively varying during exposure the intensity of the laser diodes so as to reduce or increase the spot size resulting thereby.

Preferably, the step of selectively varying during exposure includes the step of selectively varying the current provided to the laser diodes.

In accordance with a preferred embodiment of the present invention, the step of selectively varying the current includes the steps of pre-exposure calibration of the laser diodes power and on the flight determination of the actual current to be provided to each the laser diode during exposure.

Further, the step of pre-exposure calibration preferably includes the steps of mapping the variations in location of the drum surface with respect to the aligned optical fibers and defining a correction function between the variations in location and the laser diodes intensity.

Still further, the step of on the flight determination includes providing a location on the drum surface, and employing the correction function to determine a correction factor so as to correct the intensity of the laser diode.

According to an alternative embodiment of the present invention, the step of pre-exposure calibration includes the steps of mapping the variations in dot percentage of a reference exposure on the drum surface and defining a correction function between the variations in location and the laser diodes intensity and the step of on the flight determination includes the steps of providing a location on the drum surface and its current dot percentage and employing the correction function to determine a correction factor so as to correct the intensity of the laser diode.

There is also provided in accordance with a preferred embodiment of the present invention a system for exposing a printing member with a pattern representing an image to be printed which includes:

A. a drum for mounting an IR sensitive printing member on a surface thereof, the drum being rotating about a longitudinal axis thereof to affect interline exposure of the printing member with the information representing the image;

B. an imaging apparatus which includes a plurality of modulateable IR laser diodes, each coupled to a corresponding optical fiber, the optical fibers are aligned at a distance from the printing member and providing an output light beam and a stationary telecentric lens assembly which operates to image the output light beam onto the printing member so as to record the information representing the image thereon; and C. means for moving the imaging apparatus generally parallel to the longitudinal axis of the drum so as to affect intraline exposure of the printing member.

The present invention also includes printing members. These printing members of the present invention overcome the above mentioned drawbacks in the existing plates and/or printing members, as the printing members of the present invention have improved printability, improved sensitivity and improved ease of cleaning. Additionally these printing members can be imaged both on and off press.

The printing members of the present invention comprise a substrate layer, with an intermediate radiation absorbing layer, over the substrate. A surface coating layer is over the radiation absorbing layer.

The radiation absorbing layer is of a material oleophilic to ink and absorbs ablative energy, preferably from a low-energy infra-red laser, such that at least a partial thickness of the radiation absorbing material remains, post ablation, to support an image to be transferred to a printing medium, such as paper, and for attracting and retaining ink dispersed onto the printing member, from an ink roller or the like. Since this intermediate layer carries the image and retains the ink, the distance between the surface coating layer and the inked image is minimized. This minimal distance provides the printing member with desired characteristics, similar to those of planographic plates, as the printing member can be inked quicker and easier, saving time and labor costs. Since the ink is closer to the surface of the printing member, printing with the printing member requires less pressure from the drums, cylinders, rollers, other components and the like (of the press or the like), resulting in less wear and longer usable life for this printing member. Moreover, this printing member may be cleaned automatically or manually on-press.

BRIEF DESCRIPTION OF THE DRAWINGS

The present invention will be understood and appreciated more fully from the following detailed description taken in conjunction with the appended drawings, wherein like reference numerals indicate corresponding or like components, in which.

DETAILED DESCRIPTION OF THE EMBODIMENT

Figure 3:
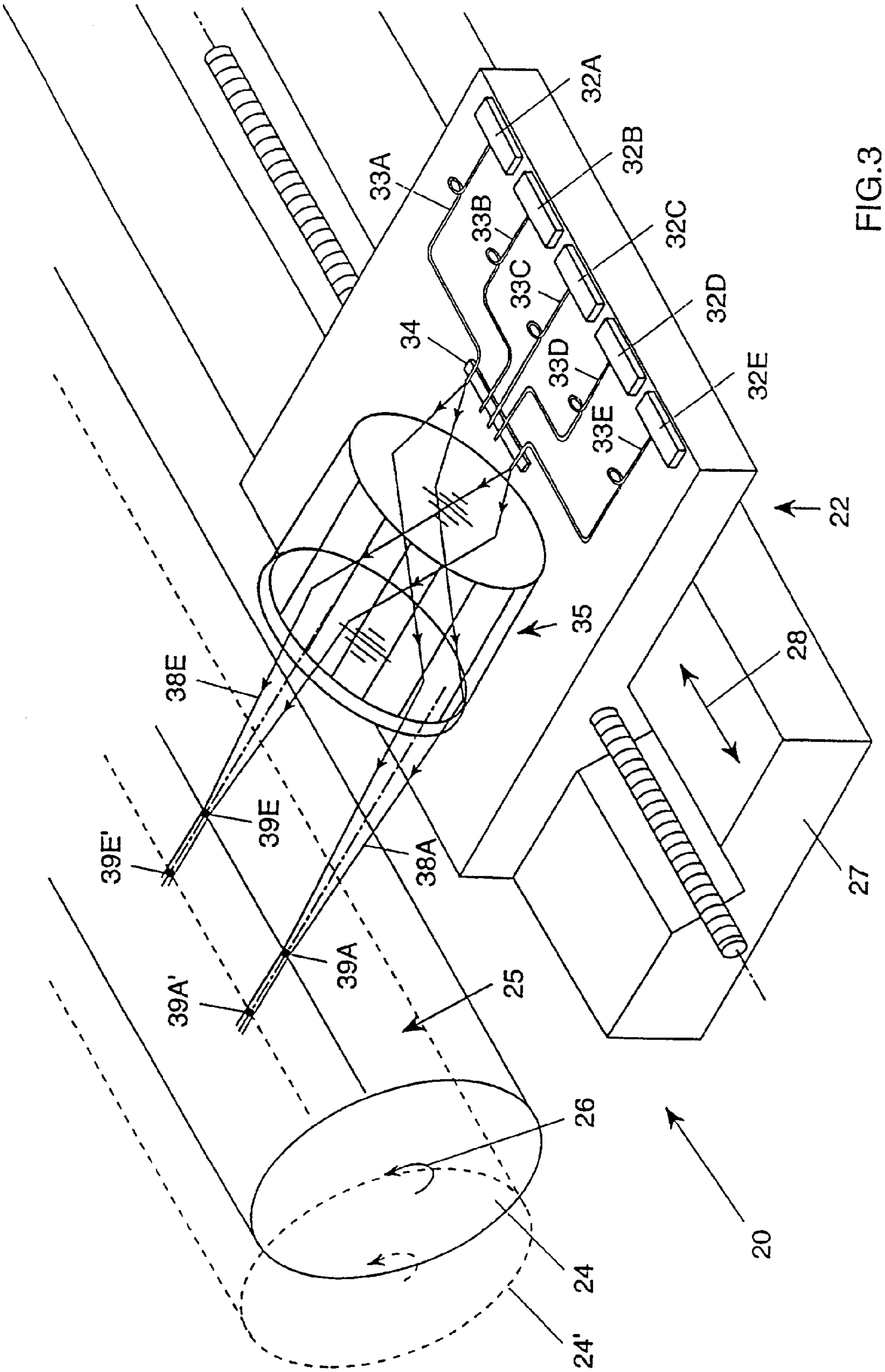
FIG. 3 is a schematic pictorial illustration of a printing system, constructed with an imaging apparatus according to a preferred embodiment of the present invention.

Reference is now made to FIG. 3 which illustrates a printing system 20 which comprises, similarly to the prior art printing system 1, an imaging apparatus 22 and a drum 24. The drum 24 is mounted on a press or other similar assembly (discussed below) and is movable in a range of positions illustrated by the drum 24 (in solid lines) and the drum 24' (in broken lines). The drum 24 rotates in its mounting to provide the intraline exposure of a printing member 25 mounted thereon as indicated by arrow 26 wherein the imaging apparatus 22 is movable along a guiding support 27 as indicated by arrow 28 to affect scanning in a line by line fashion of the printing member 25 mounted on the drum 24. The printing member 25 is designed to wrap around the drum 24, preferably leaving a slight gap for adjustment and mounting, and is secured to the drum 24 by conventional clamping means (not shown).

The printing system 20 may be any system operative to expose a printing member 25, with a pattern representing an image to be printed on it. The printing member 25 may be of either conventional construction or in accordance with the present invention (printing members 300, 300' detailed below). This printing system 20 and cylinder, formed at least by the drum 24 and printing member 25, may then be incorporated, without limitation on a digital offset press or other similar offset press (discussed below), a thermal printer or a plate setter. For example, in a digital offset press, or other similar offset press, the cylinder would preferably be the plate cylinder and the printing system would be mounted on the press proximate this plate cylinder in accordance with the present invention.

Presses that may employ the present invention include, plate cylinders in communication with blanket cylinders. The blanket cylinders are in communication with impression cylinder, larger in diameter than the plate and blanket cylinders. Ink, preferably hydrocarbon based inks commonly used in waterless offset printing (lithography) processes is supplied to the print cylinder from an ink train, preferably having rollers that transfer the ink to the printing members on the plate cylinder. The now inked plate, transfers the image to the blanket cylinder. When a medium to be printed, typically a sheet of paper, is placed between the blanket cylinder and the impression cylinder, the inked image is transferred to the medium.

The cylinders and other components of these conventional presses are driven by components, such as stepper motors, well known in the art. All other electrical components, associated with those presses, are well known in the art. The movements of the plate cylinder (formed by the drum 24), blanket cylinder, impression cylinder and rollers are preferably coordinated depending upon the printing operation to be performed.

The number of printing systems 20 and cylinders, in accordance with the present invention, is dependent upon the printing operation desired. For mass copying of text or sample monochrome line-art, a single print system 20 and cylinder may suffice. To achieve full tonal rendition of more complex monochrome images, it is customary to employ a "duotone" approach, in which two systems apply different sensitivities of the same color or shade. The press may contain another station to apply spot lacquer to various portions of the printed document, and may also feature one or more "perfecting" assemblies that invert the recording medium to obtain two-sided printing.

One particular press apparatus that may employ the drum 24, with a printing member 25 or alternately, the printing members 300, 300' of the present invention (detailed below) (as a cylinder assembly), and the printing system 20, all of the present invention, is disclosed in U.S. Pat. No. 5,469,787 Turner, et. at.), incorporated by reference herein. This press is a full-color press, that applies ink (preferably hydrocarbon based inks commonly used in waterless offset printing (lithography) processes, as above) according to a selected color model, the most common being based on cyan, magenta, yellow and black (the "CMYK" model). Specifically, the cylinder (including the drum 24 and printing member 25) of the present invention is preferably designed to serve as a plate cylinder and could be substituted for the plate cylinders 1, 2 of the Turner, et. al. apparatus. Since the Turner, et al. apparatus employs a minimum of two plate cylinders, there would be at least two printing systems 20, one for each of the cylinders of the press (apparatus) for exposing four printing members 25 (or alternately printing members 300, 300' of the present invention).

Figure 1:
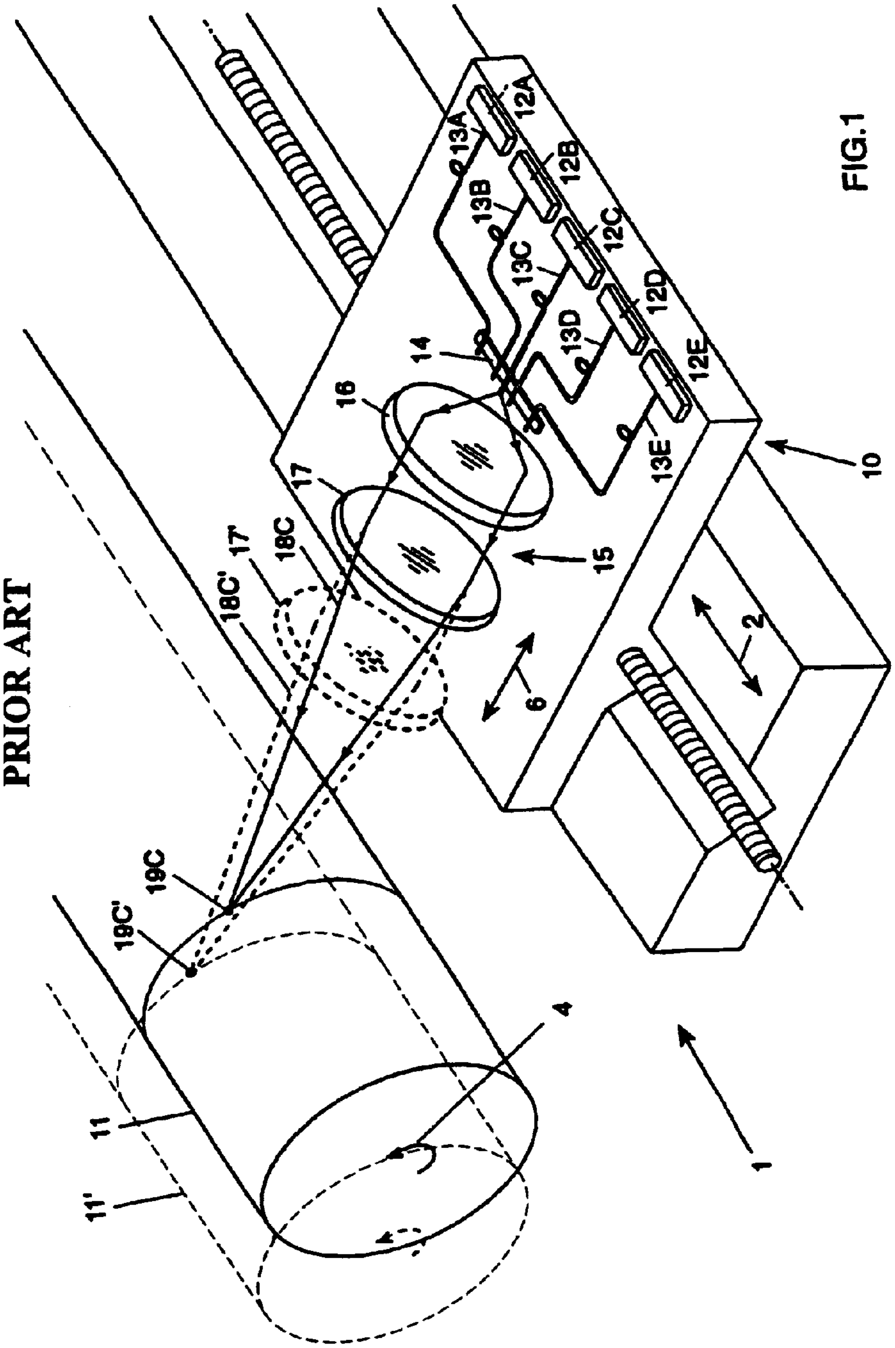
FIG. 1 is a schematic pictorial illustration of a printing system having a prior art imaging apparatus based on an autofocus lens assembly.
Figure 2:
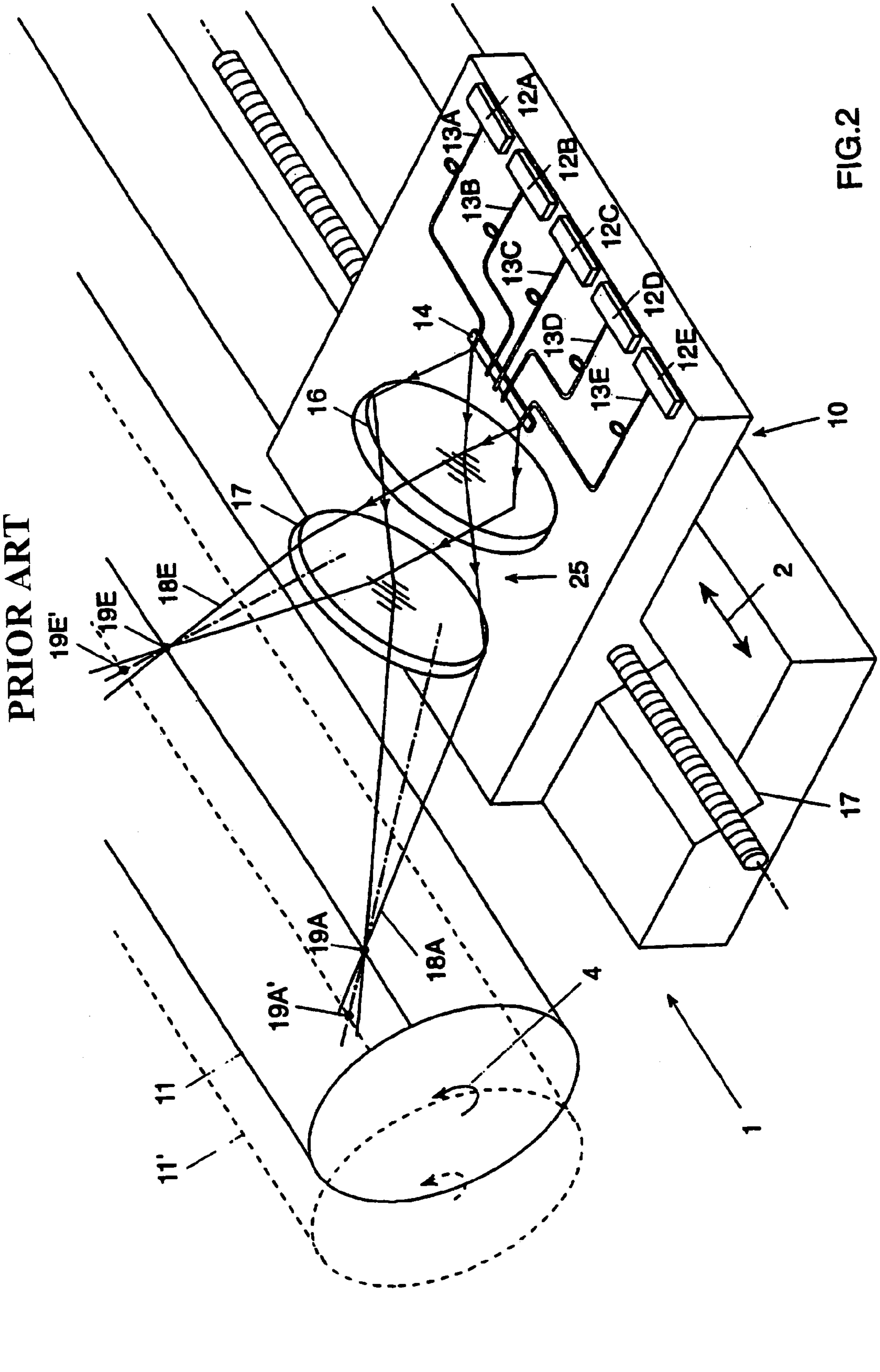
FIG. 2 is a schematic pictorial illustration of a printing system, having a prior art imaging apparatus based on a stationary lens assembly.

Continuing with FIG. 3, the imaging apparatus 22 comprises, similar to the prior art imaging apparatus 10 (shown in FIG. 2 above), an array of IR laser diodes 32, of which five are referenced 32A–32E. Each laser diode 32 is attached to a corresponding optical fiber 33A–33E in a pigtail type attachment, and the light emitting ends of the plurality of fiber optics are aligned at 34. Preferably, the optical fibers 33 are aligned in 34 in a linear array with predetermined spacings therebetween.

The light from all IR laser diodes 32 which is modulated in accordance to the information representing the image to be printed exposed on the printing member mounted on drum 24 is focused onto the drum 24 by a single telecentric lens assembly 35. The telecentric lens assembly 35 is a stationary lens assembly which obviates the use of the autofocus lens mechanism and is advantageous with respect to the stationary lens assembly of the prior art.

It will be appreciated that a particular feature of the present invention is the use of a telecentric optical assembly which is enabled by the use of optical fibers 33 with a relatively small numerical aperture, preferably smaller than 0.15.

It will further be appreciated that an advantage of telecentric optical assemblies is that they provide an effective focusing region, rather than a focal point, with a typical focal depth of tens of microns, whereby a region wherein changes in the distance between the exposure spots on the printing member and the aligned optical fibers 34 are compensated both in terms of position and spot size.

As illustrated in FIG. 3, the drum 24 is shown in two different locations denoted 24 and 24' to indicate a different distance of the printing member mounted thereon and the aligned optical fibers at 34. Within that range, as illustrated in FIG. 3, the use of a telecentric optical assembly 35 results in an equal lateral distance between exposure spots 39A and 39E and exposure spots 39A' and 39E', whereby the accuracy in the position of the exposed spots on drum 24 is retained albeit the change in distance between the printing member and aligned optical fibers 34.

Furthermore, in the embodiment of FIG. 3, the optical fibers 33 are optical fibers having a numerical aperture which is smaller than 0.15, the lens assembly 35 having a demagnification power of up to three so as to provide an output numerical aperture of the imaging apparatus 22 which is smaller than 0.45. Consequently, within the focusing range the spot sizes of exposed spots 39A and 39A is similar as is the spot size of exposed spots 39E and 39E. An example of an optical fiber having an output numerical aperture smaller than 0.15 usable in the imaging apparatus 22 is SDL-2360-N2, or SDL-2320-N2; commercially available from SDL, Inc. of San Jose, Calif., USA. A particular feature of the present invention is that although the numerical aperture of the optical fibers 33 is relatively small, the power of the laser diodes 32 is selected to be relatively high, say 0.5 Watts or more. A light spot of 20 microns on the exposure surface, i.e. the image plane, is obtained, with a power density exceeding 0.6 Megawatt/in$^2$ on the image plane with the output numerical aperture being smaller than 0.45 as described above.

Figure 4:
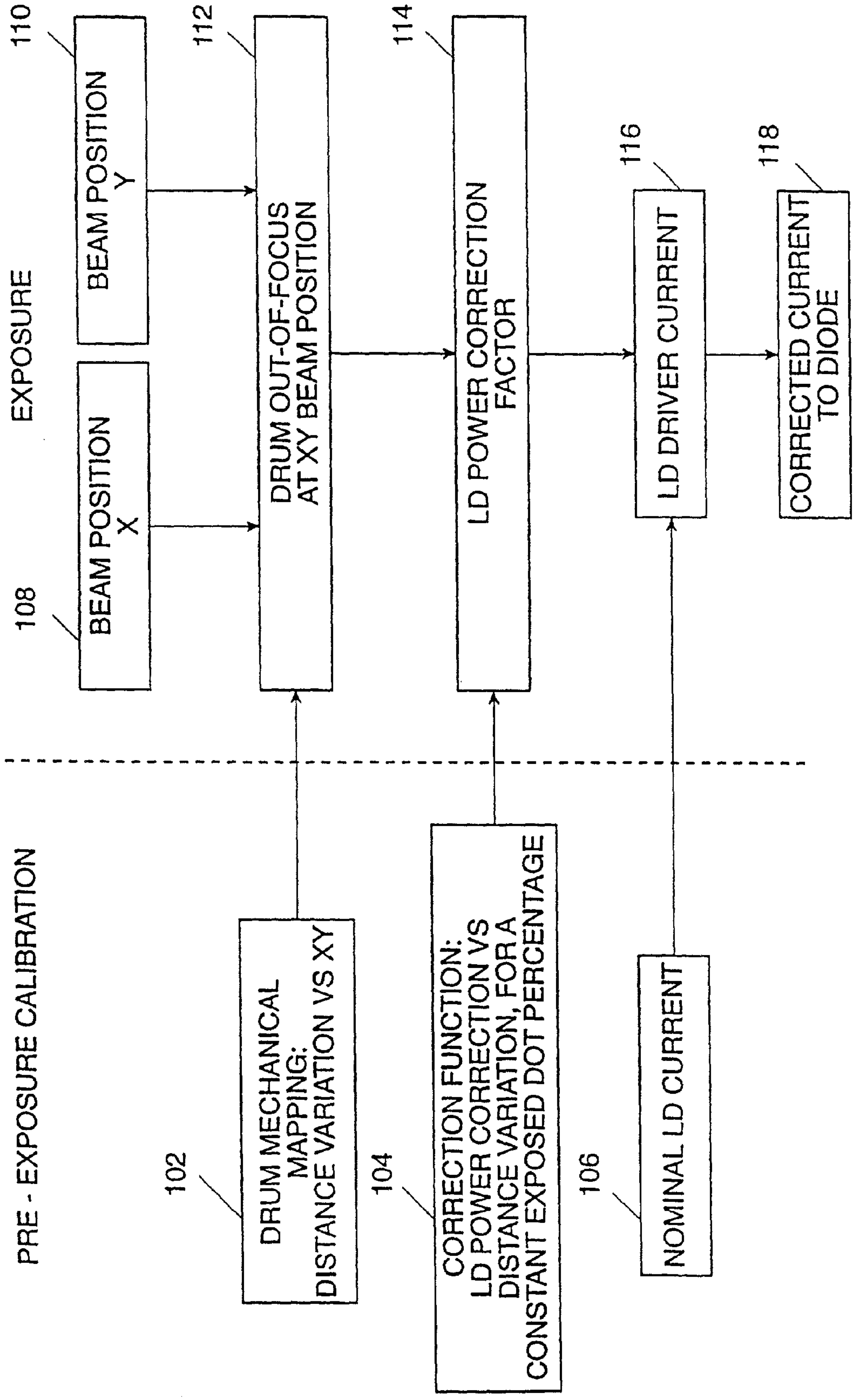
FIG. 4 is a schematic block diagram illustration of a preferred method for controlling the spot size of the exposure spots of the imaging apparatus of FIG. 3.
Figure 5:
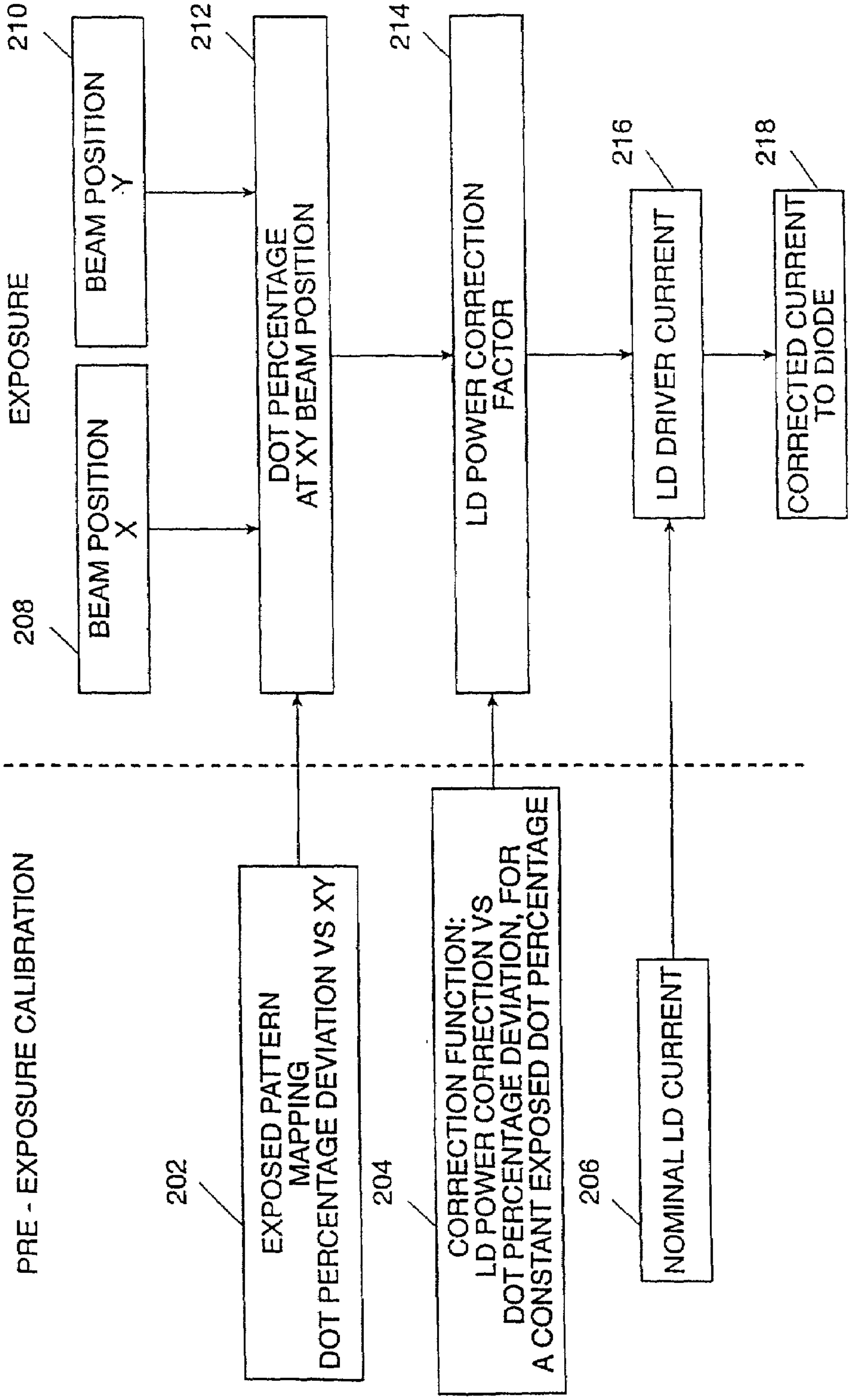
FIG. 5 is a schematic block diagram illustration of another preferred method for controlling the spot size of the exposure spots of the imaging apparatus of FIG. 3.

According to a preferred embodiment of the present invention, the laser diodes are employed to control the size of the exposed spot on the printing member by varying the intensity thereof as described in detail with respect to FIGS. 4 and 5 to which reference is now made. The method of FIG. 4 comprises pre-exposure calibration steps and on the flight beam intensity determination steps. Information obtained in the pre-exposure calibration steps is integrated with information accumulated during exposure, i.e., on the flight, to provide the desired correction in the intensity of each laser diode so as to compensate for inaccuracies in the spot size of the exposure spot on the printing member mounted on drum 24.

The pre-exposure calibration steps include the step 102 of "mapping" the surface of drum 24. Since the drum 24 and guiding support 27 are not perfect in shape, the distance between the drum surface and the aligned optical fibers 34 is not constant. Therefore, the distance for each location on drum 24, designated XY location and the aligned fibers 34 is measured and data which indicates for each XY location that distance, i.e., whether it is in focus or out of focus with respect to lens assembly 35 is stored.

The pre-exposure calibration steps further include the step 104 of preparing and storing a correction function in which the power of the laser diode for a given out of focus distance for given printing parameters, such as a constant exposed dot percentage, is determined.

Further, the pre-exposure calibration steps also include the step 106 of determining a nominal power of each laser diode 32.

The determination steps are done for each laser diode or for one or more selected calibration diodes. During exposure, on the flight, the beam position for a desired laser diode in X and Y is determined as indicated by steps 108 and 110. For the determined XY position, the out of focus information is provided by retrieving it from the stored results of step 102, to provide the extent of out of focus for that location as indicated by 112.

Then, with the information of the correction function provided from the information determined at 104, a power correction factor 114 is determined. This factor is multiplied by the nominal laser diode current from step 106 to obtain real laser diode driver current 116 which is provided to the diode as indicated in step 118 so as to obtain the correct power which provides the required intensity for compensating for spot size inaccuracy for the selected diode in the selected location. For example, such correction may be made for laser diode 32A for correcting the resulting spot size at 39A and/or 39A'.

It will be appreciated that usually, the above described method will be employed to calibrate a single diode or a limited number of diodes operating as calibration diodes. Variations in the intensity of all other diodes will be done accordingly.

Reference is now made to FIG. 5 which illustrates another method for correcting the beam intensity of the laser diodes so as to correct the spot size of the exposed spots on the drum 24.

The method of FIG. 5, similarly to the method of FIG. 4 includes a number of pre-exposure calibration steps and a number of on the flight correction steps.

In step 202, a pre-exposure pattern is imaged on the drum and a map of the dot percentage resulting therefrom is prepared, i.e. the dot percentage vs. the location XY on drum 24. Step 202 is similar to step 102 except that it is based not on the physical variations in the drum surface but on the variation in dot percentage from a constant dot percentage of a test pattern.

In step 204, a power correction function is computed from the laser power and the deviation of dot percentage from a constant exposed dot percentage. The information obtained in steps 202 and 204 is used as input as well as the nominal laser diode current (step 206) for each laser diode in the on the flight steps.

During exposure, for a beam position XY at 208 and 210, the dot percentage at the XY location is determined as indicated by step 212. Then, in step 214, a laser diode correction factor is computed for a diode, which may be a calibration diode. The laser diode correction factor is then computed from the correction function computed before actual exposure and the current dot percentage for the current XY location.

From the power correction factor (step 214) and the nominal laser diode current 206, a laser diode driver current 216 is computed from which the corrected current 218 to the selected laser diode is drawn.

It will be appreciated that the preferred embodiments described hereinabove are described by way of example only and that numerous modifications thereto, all of which fall within the scope of the present invention, exist. For example, the printing system 20 may be a flat bed based printing system and not a drum based system as illustrated and described hereinabove.

Figure 6:
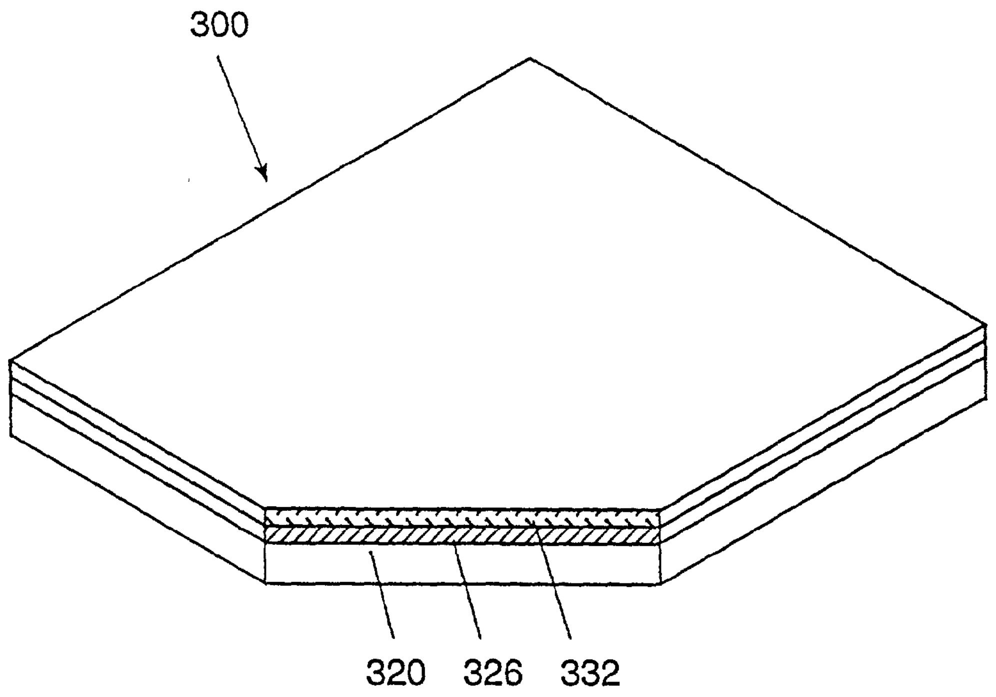
FIG. 6 is a perspective view of a component of the present invention including a partial cross sectional view cut from a corner (the corner in broken lines)
Figure 7:
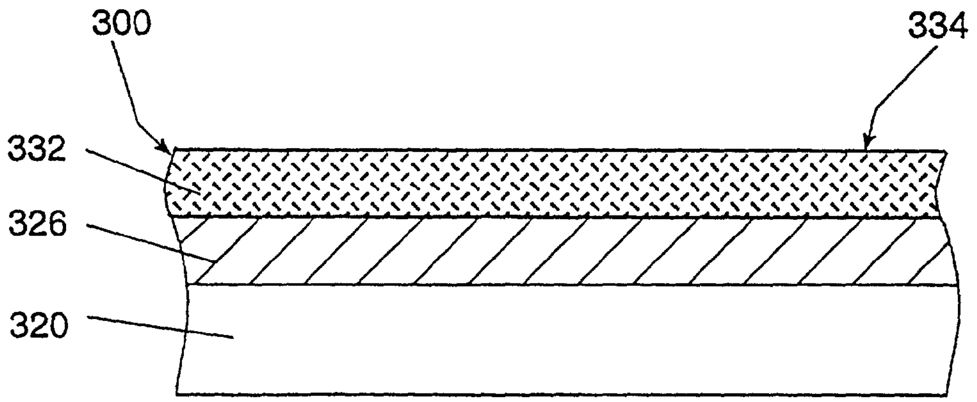
FIG. 7 is an enlarged cross sectional view of the cut-away corner of the present invention.
Figure 8:
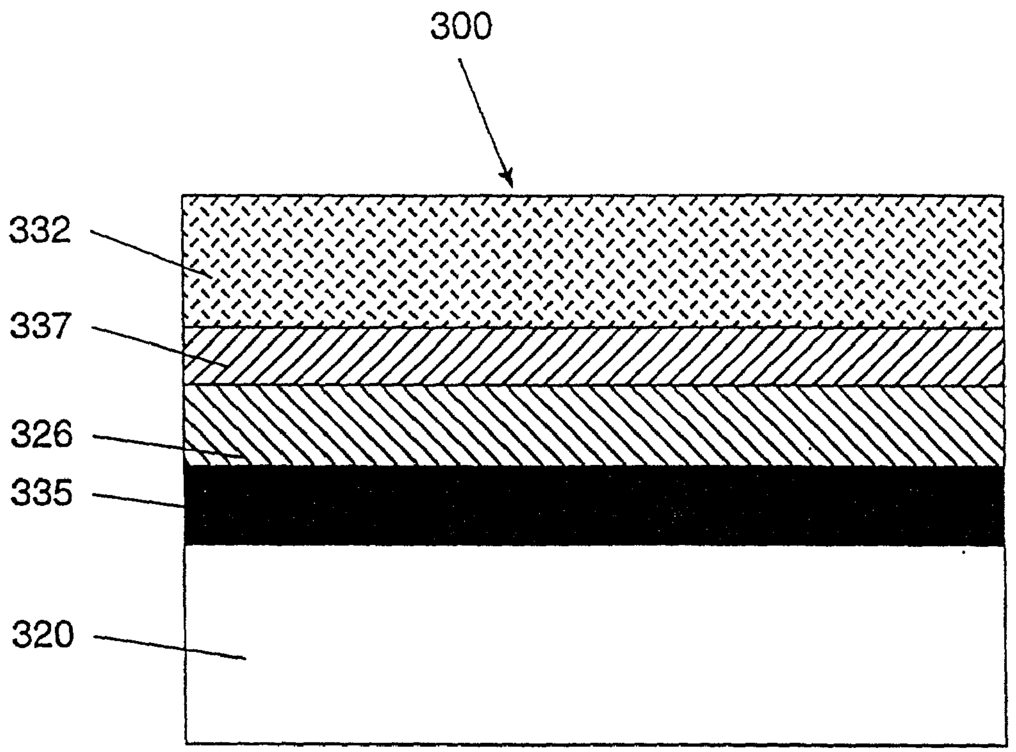
FIG. 8 is an alternate embodiment in an enlarged cross sectional view of the cut-away corner of the present invention.

Reference is now made to FIGS. 6–8, that illustrate printing members 300, 300' that can be placed on the drums 24, as an alternate to the printing member 25, and imaged on or off press using the printing system 20 of the present invention. These printing members 300, 300' can also be used with other printing/imaging apparatus as well as with other equipment (i.e., press apparatuses and components thereof) used in offset printing and related processes and could be imaged on or off press. These printing members 300, 300' are designed for imaging with radiation in the infra-red region of the spectrum, between the visible and microwave regions of the spectrum, with wavelengths that range from approximately 0.75 micrometers to approximately 1000 micrometers. See, Chambers, Science and Technology Dictionary, W&R Chambers, Ltd. (1991). These printing members 300, 300' are preferably in the form of a sheet-like plate. As used herein, the term "plate" refers to any structure with a surface capable of having an image recorded thereon, that has different regions thereof, corresponding to the recorded image, these different regions exhibiting differing affinities for the above described ink(s). These "plates" may be in configurations including those of traditional planar or curved lithographic plates that are commonly mounted on plate cylinders of a printing press, as well as cylinders, such as the roll surface of a plate cylinder, an endless belt, or other arrangement.

In FIGS. 6 and 7, the printing member 300 is formed of at least three layers. A first or substrate layer 320, forms a base or substrate for the printing member 300. A second radiation absorbing layer 326, that carries the image to be printed (once the printing member is imaged by exposure of ablative radiation, also known as ablation), is over the first layer 320. A third surface coating layer 332 is over the second layer 326. The surface coating layer 332 is of a material with an affinity for the ink(s) substantially less than the affinity for the ink(s) of the second layer 326.

The first layer 320 is a base or substrate layer that supports the second 326 and third 332 layers, as well as any optionally added intermediate layers (detailed below). Materials for this first layer 320 include polyester or metal, preferably aluminum, at a preferred thickness of approximately 150 microns to approximately 400 microns. Preferred polyester bases include materials commercially available under the trade name Melinex®, from Imperial Chemical Industries, London, England, Product Numbers 339, 453, 505, 506, 542, 569, 725 and 742.

The first layer 320 may also include additional components, depending on the material(s) that comprise this first layer or substrate 320. Where the substrate has an aluminum layer, it is preferable, but not essential, to have a separate thermally insulating layer including polyesters and/or polyurethanes between the aluminum and the second layer 326. This thermally insulating layer can either be coated onto the aluminum or can be bonded, by conventional methods and materials, as a pre-prepared plastic sheet, preferably to a thickness of approximately 40 microns. However, where the second layer 326 is sufficiently thick, greater than two grams per square meter, there is not any need for this separate thermally insulating layer.

If the substrate material comprises polyester, it may be necessary to prepare the surface with a sub-coating, that will enhance adhesion of the second layer 326. If the second layer 326 is deposited from an aqueous dispersion (as discussed below), the sub-coating should be hydrophilic so that the dispersion, from which the second layer 326 is deposited, coats easily and uniformly and does not reticulate. It is preferable that this sub-coating be resistant to solvents. This solvent resistance can be generally achieved with some degree of cross-linking after deposition on the polyester substrate. Materials for use as sub-coats include resins such as solvent based and water borne polyurethane resins.

Additionally certain polyester based materials, that can be used as the first layer 320, already include sub-coatings listed above. These polyester-based substrate materials include the above listed Melinex® materials Numbers 339, 453, 505, 506, 542, 569, 725 and 742.

The second layer 326, intermediate the first layer 320 and the third layer 332, supports the image and the ink(s) associated with its transfer (in the above described presses to a blanket cylinder) on the printing member 300. Specifically, this second layer 326 is of an infra-red radiation absorbing and oleophilic material, for absorbing infra red radiation upon ablation (discussed below). This second layer 326 is of a thickness, such that upon ablation (as detailed below), a thickness of this material remains as the second layer 326, that is sufficient to hold the ink(s) of the ablated image. The oleophilic nature of this material of the second layer 326 provides this layer with a strong affinity for ink(s). This second layer 326 provides adherence of the first 320 and third 332 layers while also providing solvent and dry rub resistance.

By carrying the image on the second radiation absorbing layer 326, the distance between the surface coating layer 332 and the image is minimized. The printing member 300 is closer to being planographic, and as such, can be inked faster, resulting in more prints in less time. Additionally, since the ink is closer to the surface 334 of the printing member 300, less force is required to compress the cylinders (print cylinder and blanket cylinder, as discussed above), and thus, the printing member 300, upon transferring the inked image to a blanket cylinder or the like. Thus, the printing member 300 will have a longer usable life as a result of less compression and wear on it.

This second layer 326 is preferably a carbon loaded organic resinous material layer. The carbon is preferably carbon black, but could also be graphite or the like, while the organic resins may include binders for the carbon such as polyurethanes, nitrocellulose, polyvinyl chlorides or acrylates. These carbons, and in particular the carbon black, can be in both aqueous and non aqueous dispersions.

Aqueous dispersions of carbon black include Stan-Tone® 90WD01 black acrylic dispersion, from Harwick Chemical Corporation, Akron, Ohio, Tint-Ayd® NV 7317 black acrylic dispersion, from Daniel Products Company, Jersey City, N.J. These dispersions can be combined with aqueous resin dispersions such as Neorez® 9679 polyurethane, from Zeneca Chemicals Corp., Wilmington, Mass., Joncryl® 98 acrylic polymer emulsion, from S.C. Johnson & Son, Inc., Racine, Wis., Airflex® 420 vinyl acetate-ethylene emulsion, from Air Products and Chemicals, Inc., Allentown, Pa., and Bayhydrol® polyurethane dispersion, from Bayer Aktiengesellschaft, Germany. Other carbon blacks, such as those available under the trade names Mogul® L and Regal® 400R, from Cabot Corporation, Boston, Mass., Raven® 5000 and Raven® 1250, from Columbia Carbon Company, New York, N.Y., and Flamrus 101, from Degussa, AG, Frankfurt on Main, Germany, may be dispersed in vinyl acrylate resins, such as Desotech E048, from DSM Resins, BV, Zwolle, The Netherlands, and phenolic resins such as Bakelite® 7550, from Georgia-Pacific Resins, Inc., Atlanta, Ga.

Non-aqueous dispersions of carbon black include Tint-Ayd® 1379, available from Daniel Products Company (above). These non-aqueous materials contain a carrier resin and may be used alone or together with a binder resin, in accordance with the binder resins described above.

This layer 326 may also include additional components, such as plasticizers (i.e., dibutyl phthalate and tritolyl phosphate), infra-red sensitivity enhancers, adhesion promoters, and cross-linking agents (e.g., dicyanide and/or organic acid anhydrides depending on the resin system). The adhesion promoters typically include proprietary organo-silicones, such as Adhesion Promoter HF-86, from Wacker Silicones, Adrian, Mich., Baysilone Coating Additive Al3468, from Bayer Silicone, AG Leverkusen, Germany, Silopren Bonding Agent, from Bayer Silicone AG, and Syl-Off® 297 Anchor Additive, from Dow Corning Europe, LaHalpe, Brussels, Belgium. These additional components alone, or combinations thereof, assist the formation and/or adherence of this second layer 326 to either or both of the first 320 and third 332 layers.

This carbon-based material, that forms the second layer 326 is coated to a substantially uniform thickness, from approximately 1 gram per square meter to approximately 10 grams per square meter. This thickness is dependent upon the material used for the first layer 320, as well as any additive materials (discussed above) thereto. This carbon coating is preferably approximately between 20% and approximately 60% carbon (by weight percent of the coating dispersion). This range provides suitable levels of sensitivity without considerably decreasing the rub resistance of the coating.

The third layer 332 is a surface coating layer of an oleophobic material. This layer 332 has a repellence for ink(s), and is preferably abhesive to ink(s). Preferably this layer 332 is primarily of a silicone material (i.e., polymer), such as polysiloxane. This layer may also include additives to enhance performance, for example less than 10% solids of carbon to facilitate effective post cleaning without detracting form the ink repellence of the surface. Layer 332 is preferably of a thickness from approximately 0.5 grams per square meter to approximately 3 grams per square meter, with the most preferred thickness being approximately 1 gram per square meter to approximately 2 grams per square meter.

Turning now to FIG. 8, there is shown an alternate printing member 300', of multiple layers. This printing member 300' includes substrate 320, radiation absorbing 326 and surface coating 332 layers, identical in materials and function to those of the printing member 300 (detailed above), but also includes additional intermediate layers 335, 337. The first intermediate layer 335, between the substrate 320 and the infra-red absorbing layer 326 is a layer of an adhesion promoter, for facilitating the adhesion of the substrate 320 with the carbon of the infra-red absorbing layer 326. This layer 335 may be principally a binder such as polyurethane or polyacrylate or methyl methacrylate, that serves to have a high adhesion to the substrate layer 320 and to provide a surface that will give good adhesion to the layer cast on it. This first intermediate layer 335 is preferably of a thickness of approximately 0.5 grams to approximately 2 grams per square meter.

The second intermediate layer 337, between the infra-red absorbing layer 326 and the surface coating layer 332 is a primer for the silicone based polymer of this layer 332. Examples of primer materials for this intermediate layer 337 include Dow Corning Silicone Primers Nos. 1205 and 92-023 (Dow Corning Europe, La Halpe, Brussels, Belgium), and Primer Nos. 6781, 3544, SMK 1311, SMK 2100 and SMK 2101, from Wacker Silicones, Adrian, Mich. This layer 337 is preferably of a thickness of approximately 0.4 grams per square meter to approximately 1 gram per square meter. Alternate embodiments of this printing member 300' include only one of these two intermediate layers 335, 337.

The resultant printing members 300, 300' may be automatically cleaned, specifically on-press, where all processing is automatic and there is no need to observe the process visually. Thus, the printing members 300, 300' do not have to be made of different colored materials to show visual contrast between layers, as they will not be seen by the operator during or after cleaning. For example, if the surface coating layer 332, remaining on the imaged radiation absorbing layer 326 is polymeric, it will appear black because it is transparent to the thickness of carbon material, black in color, of the remaining radiation absorbing layer 326.

The printing members 300, 300' may be imaged by ablation with the printing system 20 of the present invention, in accordance with the methods described above. Other "on press" ablation, as well as "off press" ablation for the printing members 300, 300', with lasers, preferably infra-red lasers of low energy (providing to the surface of the printing members 300, 300' an energy of approximately less than 1 joule per square centimeter), or the like is also permissible. All of these ablations are performed on the surface coating layer 332 side of the printing member 300, 300'. The ablative radiation, preferably at wavelengths of approximately 800 nanometers to approximately 1000 nanometers, of infra red radiation is focused at the interface of the surface coating layer 332 and the infra red absorbing layer 326, of the printing member 300, and at the interface of the intermediate layer 337 and the infra red absorbing layer 326 in the printing member 300'. By focusing the radiation at these respective points, bonding between these layers is destroyed, with minimum energy absorption. This ablation is such that only a partial thickness of the radiation absorbing layer 326 is ablated, leaving a portion of the radiation absorbing layer 326 of a thickness sufficient to support the image ablated thereon and for holding the ink(s) on the remaining thickness of the radiation absorbing layer 326. This ink(s) on this remaining thickness of the radiation absorbing layer 326 is ultimately transferred to the recording medium (e.g., paper) on which the printed image is desired.

Optional additional processing of the now ablated printing members 300, 300', may be performed. For example, the printing members 300, 300' may be cleaned to remove the silicone (from the surface coating layer 332), and loose material (i.e., carbon) from the radiation absorbing layer 326. If the printing member 300' was imaged, material from the intermediate layer 335 may be removed by this cleaning as well. Cleaning may also include washing the ablated members 300, 300' with solutions such as diacetone alcohol.

EXAMPLE 1

The following coating formulation was prepared as a mixture (all numbers designating parts in the formulation are in parts by weight of the entire formulation);

| | |
|---|---|
| Neorez 9679 (aqueous dispersion of polyurethane - Zeneca Corp.) | 50 parts |
| Direct Black 19 INA dye solution (Zeneca Corp.) | 100 parts |
| Triton X-100 (Iso-Octylphenoxypolyethanol sold by BDH Poole, Dorset, England) | 0.9 parts |
| Tint-Ayd NV7317 (aqueous black dispersion - Daniel Products Company) | 88 parts |
| 2-Butoxy ethanol | 8 parts |
| Neocryl ® CX-100 cross linking agent (Zeneca Corp.) | 8 parts |
| Antara 430 (vinylpyrrolidone/styrene copolymer - GAF, Corp., Wayne, New Jersey) | 50 parts |
| Water (distilled) | 50 parts |

This mixture was coated onto 175 micron thick Melinex 339 base polyester sheet to a weight of 4 grams per square meter and dried for three minutes at 140° C. The coating was left for one week, during which it became increasingly resistant to rubbing with or without solvent (isopropanol).

The coating was then treated with a proprietary silicone primer, No. 1205 from Dow-Corning, which was dried to a coating weight of 0.5 grams per square meter. The following silicone composition was prepared from that formulation formulation (all numbers designating parts in the formulation are in parts by weight of the entire formulation):

| | |
|---|---|
| Dehesive 810 (Wacker Silicones) | 30 parts |
| Dehesive V83 (Wacker Silicones) | 1.4 parts |
| Dehesive C80 (Wacker Silicones) | 0.6 parts |
| Toluene | 80 parts |
| Isopar. H | 40 parts |

This silicone composition was bar coated onto the primer layer and dried at 130° C. for 5 minutes to give a dry coating weight of 1 gram per square meter.

The resulting article (plate) was then imaged using the printing system 20 the of present invention (detailed above), giving a sensitivity of 350 mJ per square centimeter, mounted on a waterless offset printing press. The plate was automatically cleaned with a mixture of Isopar G (Isoparaffin from Exxon) and polypropylene glycol and printed on an offset lithographic press using waterless ink.

EXAMPLE 2

A solvent based two component polyurethane was used as a pre-coating on a 175 micron thick Melinex 339 polyester sheet. The polyurethane components, Adcote 102A (Morton Adhesives Europe) and Catalyst F (Morton Adhesives Europe), were mixed in the ratio of 100 parts to 6.5 parts by weight. The mixture was then diluted with 80 parts by weight of methyl ethyl ketone, and the resultant mixture was coated on the Melinex 339 sheet with a wire wound rod, forming the pre coating. This pre-coating was dried in an oven for two minutes at 120° C. to a dry coating weight of one gram per square meter. The pre-coating was kept for a day before coating the next layer.

The following formulation was then prepared as a mixture (all numbers designating parts in the formulation are in parts by weight of the entire formulation);

| | |
|---|---|
| Desotech EO48 | 102 parts |
| Flammruss 101 Carbon | 50.4 parts |
| Toluene | 186 parts |
| Dibutyl Phthalate | 5 parts |

The mixture was subject to ball-mill mixing for 6 hours and then 1 part of Neocryl CX-100 (Zeneca Corp.) cross-linking agent and 1 part Tilicom TIPT (tetraisopropyl titanate-Tioxide UK) were added to this mixture before coating onto the pre-coating to a dry weight of 8 grams per square meter, forming a layer. The layer was dried for 2 minutes at 120° C. and was then coated with the proprietary primer (No. 12025 from Dow Corning) and silicone composition as described in Example 1 and the resultant plate was imaged in accordance with the method described in Example 1. The plate was automatically washed with diacetone alcohol and printed on an offset lithographic machine with waterless ink.

EXAMPLE 3

The following mixture for a first coating was made up (all numbers designating parts in the mixture are in parts by weight of the entire mixture):

| | |
|---|---|
| Tynt-Ayd 1379 (Daniel Products Company) | 97.5 parts |
| Toluene | 105 parts |
| Neocryl CX-100 Cross linker | 1.3 parts |

The mixture was coated on 175 micron thick Melinex 506 sheet and dried to a coating weight of 5 grams per square centimeter.

The following silicone mixture (all numbers designating parts in the mixture are in parts by weight of the entire mixture) was then prepared:

| | |
|---|---|
| SS4331 (GE Silicones-General Electric Company, Waterford, New York) 0 | 330 parts |
| SS8010 (GE Silicones) | 4.7 parts |
| SS 4300C (GE Silicones) | 3.3 parts |
| Toluene | 670 parts |

The mixture was coated onto the first coating to a weight of 1 gram per square meter and dried at 150° C. for 5 minutes.

EXAMPLE 4

The following formulation was made as a mixture (all numbers designating parts in the formulation are in parts by weight of the entire formulation):

| | |
|---|---|
| Neorez 9678 | 25 parts |
| Crosslinker CX-100 | 1.75 parts |
| 2-Butoxy ethanol | 2.5 parts |
| Stantone 90WD01 (harwick Chemical Corporation) | 50 parts |
| Water (distilled) | 75 parts |
| Q2-5211 (super wetting agent - Dow Corning) | 1.5 parts |

This mixture was coated onto a 175 micron thick Melinex 725 polyester sheet and dried at 140° C. for 3 minutes, forming a first coat. The first coat was aged for 1 week. This first coat was then coated with the proprietary primer 92-023 (Dow Corning) to a weight of 1 gram per square meter, drying at 120° C. for 2 minutes, forming a primer coat. The silicone mixture of Example 3 was coated to a dry weight of 1 gram per square meter, onto the primer coat, curing at 150° C. for 5 minutes. The resultant plate was washed with a mixture of Isopar G and polypropylene alcohol and printed on an offset lithographic machine with waterless ink.

It will be appreciated by persons skilled in the art that the present invention is not limited to what has been particularly shown and described hereinabove. Rather, the scope of the present invention is defined by the claims that follow.

What is claimed is:

1. An imaging apparatus comprising:

a drum for mounting an IR sensitive printing member on a surface thereof, said drum being capable of rotating about a longitudinal axis thereof to affect interline exposure of said printing member with the information representing said image;

a plurality of IR laser diodes, each coupled to a corresponding optical fiber, the optical fibers are aligned at a distance from an exposure surface of the IR sensitive printing member and providing an output light beam; and a stationary telecentric lens assembly which operates to image said output light beam onto said exposure surface;

whereby a lateral distance between first and second exposure spots of the output light beam on the exposure surface is invariant with a change in the distance of the optical fibers from the exposure surface, wherein the change in the distance of the optical fibers from the exposure surface is within a predetermined range.

2. The imaging apparatus of claim 1 wherein the output numerical aperture of said lens assembly is smaller than 0.45.

3. The imaging apparatus of claim 1 wherein the output numerical aperture of said optical fibers is smaller than 0.15.

4. The imaging apparatus of claim 2 wherein changes in the distance between said exposure surface and said aligned optical fibers are compensated within a range of 60 microns.

5. The imaging apparatus of claim 2 wherein changes in the distance between said exposure surface and said aligned optical fibers are compensated within a range of 60 microns and the intensity of said laser diodes is at least 0.5 Watt.

6. The imaging apparatus of claim 1 and further comprising an intensity changer attached to each said laser diodes.

7. The imaging apparatus of claim 6 wherein said intensity changer includes a current changer for changing the current of each laser diode during exposure.

8. The imaging apparatus of claim 7 wherein changes in the distance between said exposure surface and said aligned optical fibers are compensated within a range of 40 microns, whereby a total range of compensation of 100 microns is achieved.

9. The imaging apparatus of claim 1 characterized in a light spot of about 20 microns on said exposure surface and a power density exceeding 0.6 megawatt per squared inch on said exposure surface.

10. An imaging apparatus for recording an image on a printing member comprising a light source providing an output light beam and an optical assembly which operates to image said output light beam onto an exposure surface of said printing member characterized in a light spot of about 20 microns on said exposure surface and a numerical aperture smaller than 0.45.

11. A method for controlling the spot size of an imaging apparatus comprising:

a drum for mounting an IR sensitive printing member on a surface thereof, said drum being capable of rotating about a longitudinal axis thereof to affect interline exposure of said printing member with the information representing said image a plurality of IR laser diodes each coupled to a corresponding optical fiber, the optical fibers being aligned at a distance from an exposure surface of the IR sensitive printing member and providing an output light beam, and a stationary telecentric lens assembly which operates to image said output light beam onto said exposure surface, the method comprising the steps of:

selectively varying during exposure the intensity of said laser diodes so as to reduce or increase a spot size of the output light beam resulting thereby; and imaging said output light beam onto said exposure surface, whereby a lateral distance between first and second exposure spots of the output light beam on the exposure surface is invariant with a change in the distance of the optical fibers from the exposure surface, wherein the change in the distance of the optical fibers from the exposure surface is within a predetermined range.

12. The method of claim 11 wherein said selectively varying during exposure comprises selectively varying the current provided to said laser diodes.

13. The method of claim 12 wherein said selectively varying the current comprises pre-exposure calibration of said laser diodes power and on the flight determination of the actual current to be provided to each said laser diode during exposure.

14. The method of claim 13 wherein said pre-exposure calibration comprises:

mapping the variations in location of the drum surface with respect to said aligned optical fibers; and defining a correction function between said variations in location and said laser diodes intensity.

15. The method of claim 13 wherein said on the flight determination comprises:

providing a location on said drum surface; and employing said correction function to determine a correction factor so as to correct the intensity of said laser diode.

16. The method of claim 13 wherein said pre-exposure calibration comprises:

mapping the variations in dot percentage of a referenced exposure on said drum surface; and defining a correction function between said variations in location and said laser diodes intensity.

17. The method of claim 15 wherein said on the flight determination comprises:

providing a location on said drum surface and its current dot percentage; and employing said correction function to determine a correction factor so as to correct the intensity of said laser diode.

18. The method of claim 11 wherein the spot size is about 20 microns.

19. A system for exposing a printing member with a pattern representing an image to be printed comprises:

a drum for mounting an IR sensitive printing member on a surface thereof, said drum being rotating about a longitudinal axis thereof to affect interline exposure of said printing member with the information representing said image;

an imaging apparatus comprising a plurality of modulateable IR laser diodes, each coupled to a corresponding optical fiber, the optical fibers are aligned at a distance from said printing member and providing an output light beam and a stationary telecentric lens assembly which operates to image said output light beam onto an exposure surface of said printing member so as to record the information representing said image thereon; and moving apparatus attached to said imaging apparatus, said moving apparatus being generally parallel to the longitudinal axis of said drum so as to affect intraline exposure of said printing member;

whereby a lateral distance between first and second exposure spots of the output light beam on the exposure surface is invariant with a change in the distance of the optical fibers from the exposure surface, wherein the change in the distance of the optical fibers from the exposure surface is within a predetermined range.

* * * * *